(12) United States Patent
Trefan et al.

(10) Patent No.: US 7,066,449 B1
(45) Date of Patent: Jun. 27, 2006

(54) PROCESS AND APPARATUS FOR UPROOTING TREES

(76) Inventors: Lajos Trefan, Toldi U. 7, H-4300 Nyirbator (HU); Szabolcs Trefan, Toldi U. 7, H-4300 Nyirbator (HU); Szilard Trefan, Toldi U. 7, H-4300 Nyirbator (HU)

( * ) Notice: Subject to any disclaimer, the term of this patent is extended or adjusted under 35 U.S.C. 154(b) by 0 days.

(21) Appl. No.: 09/959,619

(22) PCT Filed: May 3, 2000

(86) PCT No.: PCT/HU00/00040

§ 371 (c)(1),
(2), (4) Date: Nov. 1, 2001

(87) PCT Pub. No.: WO00/67557

PCT Pub. Date: Nov. 16, 2000

(30) Foreign Application Priority Data

May 5, 1999 (HU) .................................. 9901517

(51) Int. Cl.
*B66F 3/00* (2006.01)
(52) U.S. Cl. ...................... 254/124; 254/132
(58) Field of Classification Search ............. 56/16.4 R, 56/432, DIG. 12, DIG. 13; 37/301, 302, 37/904, 2 R, 2 F; 254/132, 29 R, 30, 31, 254/124; 144/34 R, 2 N, 193 R, 193 B
See application file for complete search history.

(56) References Cited

U.S. PATENT DOCUMENTS

| | | | | |
|---|---|---|---|---|
| 3,823,916 A | * | 7/1974 | Shaw | .......................... 254/132 |
| 3,871,427 A | * | 3/1975 | Wildegren et al. | .......... 144/34.2 |
| 3,974,925 A | * | 8/1976 | McKenzie | .................... 414/23 |
| 4,244,560 A | * | 1/1981 | Hawkins | ..................... 254/132 |
| 4,445,557 A | * | 5/1984 | Peters, III | ................... 144/336 |
| 5,516,250 A | * | 5/1996 | Sawyer | ........................ 414/23 |
| 5,526,637 A | * | 6/1996 | Leonard | .................. 56/16.4 R |
| 6,010,294 A | * | 1/2000 | Lyddon | ........................ 414/23 |

* cited by examiner

*Primary Examiner*—Robert C. Watson
(74) *Attorney, Agent, or Firm*—Novak Druce & Quigg, LLP; James D. Voight

(57) ABSTRACT

The subject of the invention is the excavation of trees by disrooting then by a hydraulic equipment, when the power machine (1) is connected in a rotatable manner to the timber holding frame (9), the supporting frame (3) and the elevating working cylinder (10); the timber holding frame (9) is connected to the timber holding equipment (8), wich is able to catch the timber (6) by its arms (7); the timber holding frame (9) is connected to the throwing working cylinder (5) and the supporting frame (3) is attached in a rotatable manner to the supporting cylinder (4); and in case of articulated setting-up of the supporting frame (3) the movement of the two parts of the supporting frame is done by the adjusting tool (2); then the upper part of the throwing working cylinder (5) is connect to any part of the supporting frame (3); furthermore the other end of the elevating working cylinder (10) is connected to the supporting frame (3) or in case of rigid joint setting-up of the supporting frame (3) one end of the adjusting tool (2) is connected to it, while the other end to the throwing working cylinder (5); furthermore the elevating working cylinder (10) can be connected to the timber holding frame (9) directly or via articulated power transmission.

19 Claims, 1 Drawing Sheet

PROCESS AND APPARATUS FOR UPROOTING TREES

BACKGROUND OF THE INVENTION

The subject of the invention is an equipment for the excavation of trees by disrooting them and a process for taking down the trees by this way.

Basically there are two types of processes for lumbering, i.e. separation of the bole from the root-trunk, and the assart. In the first case the root-trunk being remained in the earth after chopping down the bole is regularly extracted separately by forked pushing tools or tines mounted on a tractor (using considerable large stroke) or e.g. by blasting. According to the current methods grubs can be used as well. One type of them drills into the root-trunk and slices or splinters it. The other type drills around the root-trunk with a sharp cylinder, cuts the roots and finally excavates the root-trunk.

In case of assart the separation of the bole from the earth is done below the terrain level. If the root-trunk should also be excavated being as a more favourable solution regularly this method is used. Both types of lumbering have advantages and disadvantages. Positive character of the assart is that the quantity of the wood increases, complete soil preparation and re-trenching can be carried out afterwards, the falling tree suffers less damage, and no effort should be made to excavate the root-trunk. The assart can be carried out either manually or by machine. In the first case the rootage is digged out then cut just at the root-trunk toward the falling direction. This accident-prone work is considerably slow. Regarding the machine-made solutions drawing and expelling methods are known. In the former case a throwing double-wheel is fastened vertically to the timber (the timber is felled on it) and the rope of the pulley tackle is fastened at a certain (calculated) height to the timber as well. By the pulling power of the pulley tackle the timber is taken down then the approaching by the double-wheel can be done too. Disadvantage of the method is that due to the high pulling power very often the timber breaks.

According to the expelling method the timber is turned out by lifting the root-trunk with the blade or fork of a power machine being mounted with a felling-frame, felling-beetle and a lifting fork while in the meantime the bole is pushed ahead. In this case very often the problem is that during the holding process of the root-trunk the tool gets clogged and consequently it is not able to carry out the process or considerable high pressing force is needed. (University of Forestry and Timber Industry, textbook of Forestry Engineering faculty, Dr Rumpf János: Erdöhasználattan I. 1986, Sopron)

Patent specification No. CH 674.118 discusses an equipment mounted to the hydraulic system of a conventional machine (e.g. tractor), which in a nearly vertical position "rips out" the tree together with its roots from the earth. By the application of an equipment mounted with arms for holding the timber it takes the bole and its hydraulic cylinders apply an upward force. In the meantime an eccentric disc is actuated from the machine which forces the units of the system and the timber into an alternative movement. According to the authors it makes the process easier, which is true, nevertheless this solution is applicable economically only in cases of smaller trees. Further disadvantage is that the timber holding arms may vertically slip causing difficulties in the process.

Patent application No. WO 93/04575 discusses an equipment mounted on a machine and consisting of an abutting arm and a V-shaped dipper-cultivating tool being attached to it, which is used for felling trees with their root-trunks. Disadvantage of the equipment is that sometimes it gets clogged and does not provide proper grabbing.

BRIEF SUMMARY OF THE INVENTION

During the development of the invention our target was to invent a proper equipment and process, which are reliable and suitable for assarting trees with relatively small effort in a safe manner.

It was recognised that the above target could be achieved by an equipment which touching the timber basically at two points uses such a driving moment that the timber rotated below its centre of mass—being its centre of motion—falls.

DETAILED DESCRIPTION OF THE INVENTION

This solution provides a quantity of power consumption or power demand being less than the normal. Unbalancing the timber from its equilibrium the sum of its potential energy and motional energy changes. Changing in the loading point of the motional energy generates a supplementary force which supports the felling process by inducing a supplementary driving moment.

Figure 1:
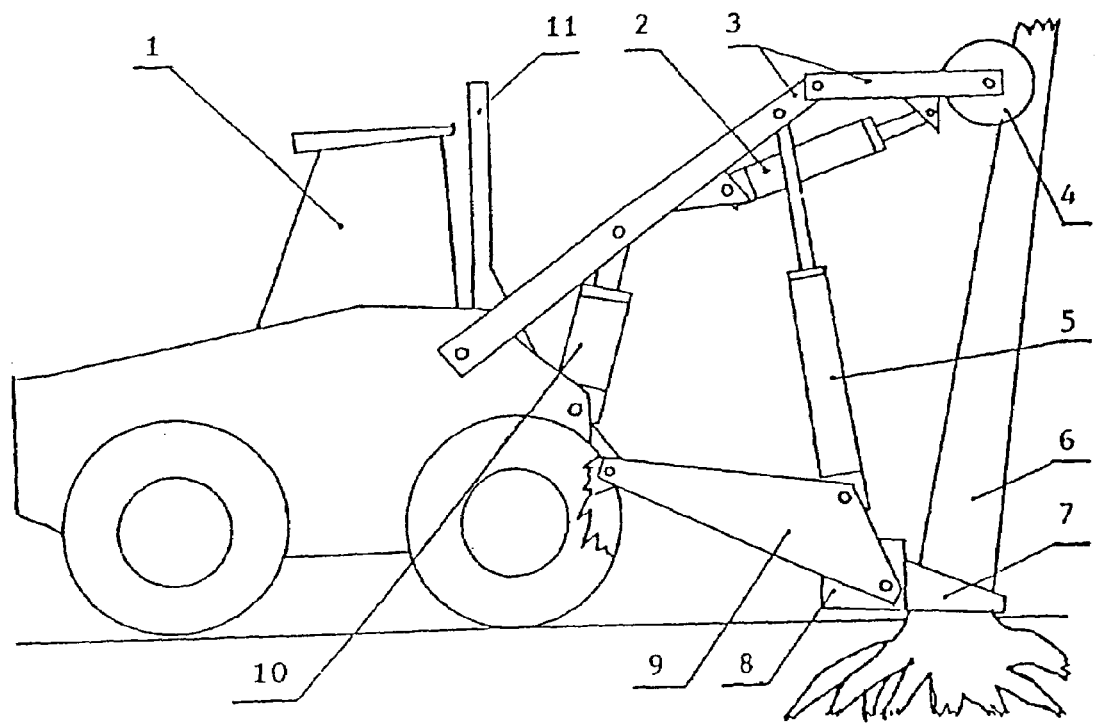
FIG. 1 shows an embodiment of the inventive apparatus for uprooting trees.
Figure 2:
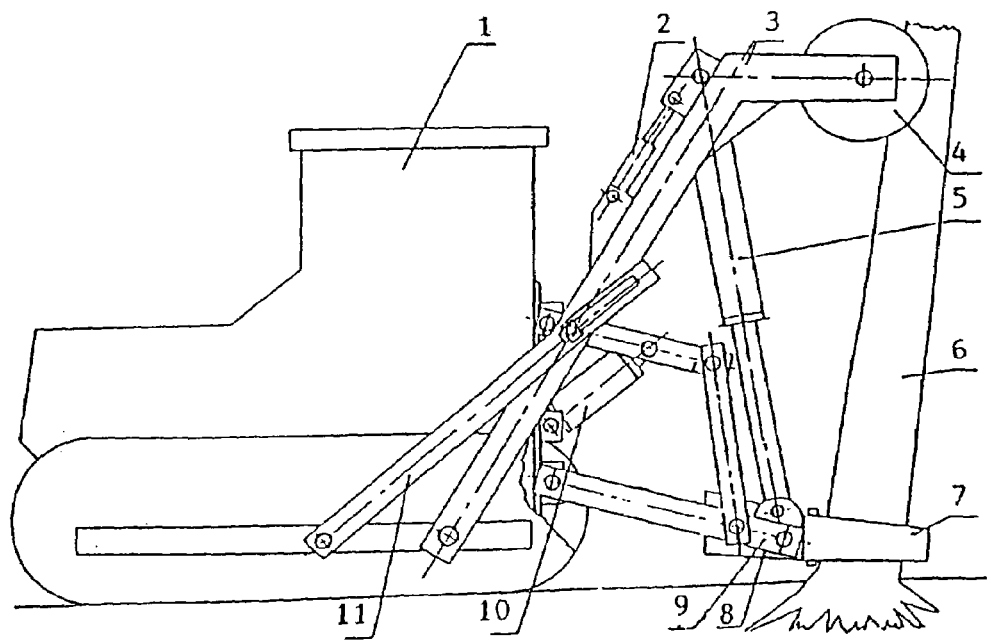
FIG. 2 shows an alternative embodiment of the inventive apparatus for uprooting trees.

The invention is presented by drawings. FIGS. 1 and 2 show the sketches of a favourable accomplishment. Units presented on them are the following.

The power machine (1) is a machine tool with suitable mass, specific ground pressure, stability, motor/hydraulic power, pulling power, cross-country capability, manoeuvrability. These factors depend on the conditions of the field, forest and the task, since in case of a forest consisting of small trees sparsely on a lowland the demands for e.g. the power, pulling power, cross-country capability are milder.

The adjusting tool (2) determines the position of the supporting cylinder (4), the point where the equipment touches the upper part of the timber (6), by influencing the location of the supporting frame (3). There are several types of solutions to it. If the supporting frame (3) consists of two arms being clamped in a rotatable manner then this adjusting tool determines the angular position of the two arms by connecting the two ends of the adjusting tool (2) to the two arms. If the supporting frame (3) consists of three arms which are connected by two articulations, the adjusting tool (2) is connected to the outer arms. It is possible to apply more adjusting tools (2), in case of two intermediate articulations two adjusting tools are necessary. The adjusting tool (2) is expediently a hydraulic working cylinder nevertheless it can be any other equivalent solution, i.e. hydro engine, tooth gear drive, electromotor, etc. The throwing working cylinder (5) is connected to the supporting frame (3) expediently in a rotatable manner. If the supporting frame (3) is a fixed one then one end of the adjusting tool (2) connects to it while the other end of it with an articulated joint connects to the upper end of the throwing working cylinder(s) (5) and in the meantime adjusts the position of its upper part. The throwing working cylinder (5) can be favourably a hydraulic cylinder or even in this case it can be another unit which is able to apply the necessary force. It is possible to apply a hydro engine or an electromotor supplied with the necessary transmission, worm, rack or screw gearing.

The supporting frame (3) touches the timber (6) through the supporting cylinder (4) and is mounted on the power machine (1) with bolts/shafts.

The supporting cylinder (4) is able to rotate on the shaft of the supporting frame (3) and basically it is a rotation-symmetric body, expediently a cylindrical body, which provides the force while rolling down on the bole of the timber (6).

The two connecting points of the throwing working cylinder(s) (5) are directly or indirectly the supporting frame (3) and the timber holding frame (9) or the timber holding equipment (8). (The latter is shown in FIG. 2). The distance between these frames can be adjusted by setting the throwing working cylinder (5). This is connected to the independently operated (e.g. "B") hydraulic cycle of the power machine (1). It is possible to apply one throwing working cylinder (5) and adjusting tool (2) or more of them. These can be connected and utilised in a parallel manner. It is advantageous if greater force or operational safety is required.

The arms (7) are used for holding the timber (6). For having better bearing area their shape is arched and the internal surface is supplied with cannelures. Those are attached to the equipment (8) which holds the timber and which is mounted on the timber holding frame (9). In special cases upward power (pulling force) can be applied on the timber by them.

The timber holding equipment (8) is connected to another independently operated (e.g. "C") hydraulic cycle of the power machine (1) and provides the transfer of the lifting, pushing and pulling power through the timber holding arms (7) to the timber (6). Due to its articulated construction relative to the timber holding frame (9) the timber holding arms (7) and the timber holding equipment (8) are able to rotate while/after the cutting-down of the timber.

The timber holding frame (9) is mounted on the power machine (1) with bolts/shafts, its height from the earth can be adjusted, furthermore its relative position during the felling can be adjusted by the throwing working cylinder (5) and/or by the elevating working cylinder (10).

The elevating working cylinder(s) (10) can be controlled by the independently operated (e.g. "A") hydraulic cycle of the power machine (1), and it is connected via a rotatable (articulated) coupling to the power machine too. In the present description the word "rotatable" is used in its widest sense. It can mean revolving motion around a fixed shaft (i.e. a bolt or a bearing) or also the movement of a shaft as it can make for example in a longitudinal slot lengthwise motion and revolving motion around an axis as well.

The other direct or indirect connecting point of it is either the timber holding frame (9) or the supporting frame (3). The setting of the relative position of one of the two frames to the power machine (1) is carried out by the elevating working cylinder (10). Expediently this connecting point of the elevating working cylinder (10) is also rotatable. If the elevating working cylinder (10) is connected to the timber holding frame (9) indirectly then articulated transmission mechanism can be applied. This solution is shown in FIG. 2. Besides this other equivalent solutions can be applied.

From safety point of view it is recommended to protect the power machine from the falling timber by an emergency system (11). It can be a frame-like assembly unit made of steel, which due to its height and shape protects the cabin of the power machine (1). The emergency system (11) can be connected either to the supporting frame (3) or to the power machine (1) or to both of them. If it is more advantageous the emergency system (11) can also be connected to the adjusting tool (2) or to the throwing working cylinder (5).

The operation of the equipment is as follows. The power machine (1) drives to the timber (6) selected for felling. By the operation of the elevating working cylinder(s) (10) and the throwing working cylinder(s) (5) the supporting frame (3) is adjusted to an upper position, while the timber holding frame (9) is adjusted to a lower position on the timber (6).

By the operation of the timber holding equipment (8) the holding arm(s) (7) embraces the lower part of the timber (6). The adjusting tool (2) sets the conditions between the timber (6) and the throwing working cylinder (5). By the operation of the elevating working cylinder(s) (10) and the throwing working cylinders (5) the supporting cylinder (4) rolls down on the bole of the timber and fells the timber off the power machine (1). Then by the timber holding arms (7) elevating/pushing/pulling the timber it is taken down.

Advantages of the equipment of the invention:
simple and reliable construction;
safe operation;
suitable for cutting down trees being in wide scale range.
Advantages of the process of the invention:
damage (breaking) to timbers is very rare,
direction of the felling can be determined accurately,
force and power demand is less than that of the known processes.

The invention is illustrated by the following Examples but they are not intended to limit the scope of the claims.

EXAMPLE 1

The equipment made according to this beneficial implementation is presented in FIG. 1.

In this case the timber holding frame (9), the supporting frame (3) and one or more elevating working cylinders (10) are connected to the power machine (1) all in a rotatable manner. The other end of the elevating working cylinder (10) is connected to the supporting frame (3) and consequently providing the height setting of the latter one. There is/are one or more throwing working cylinder(s) (5) between the supporting frame (3) and timber holding frame (9). This way the position of the latter ones is adjustable. The upper connecting point of the throwing working cylinder (5) may equally be the part of the supporting frame (3) being nearer to the power machine (figure shows this solution), or the part being nearer to the supporting cylinder (4). The two parts of the supporting frame, i.e. the one which holds the supporting cylinder (4) and the other which is coupled to the power machine, are connected in an articulated way. The adjusting tool (2) sets the position of the above two supporting units. The timber holding arms (7) used for holding the timber (6) can hydraulically be operated in the timber holding equipment (8) which is mounted on the timber holding frame (9).

The equipment is operated by setting the supporting frame (3) to upper position and the timber holding frame (9) to lower position by operating the elevating working cylinder (10) and the throwing working cylinder (5). By operating hydraulically the timber holding equipment (8) the timber holding arms (7) take the stool of the timber (6). The bole of the tree is shouldered at the top by the adjusting tool (2) and the supporting cylinder (4). The felling of the tree is done
by contraction of the throwing working cylinder (5) and/or
by contraction of the elevating working cylinder (10).

If it is desired the power machine (1) can move off from the tree for aiding the felling. Then the power machine (1) approaches and the timber holding arms (7) drop the tree.

EXAMPLE 2

Deviations from the set-up presented in the Example 1 and FIG. 1 are as follows. This implementation is shown in FIG. 2.

The supporting frame (3) is not an articulated device except its hanging-up. The upper part of the throwing working cylinder (5) is connected in a flexible manner to the adjusting tool (2). The lower (other) part of the adjusting tool (2) is connected to the supporting frame (3). Since one end of the elevating working cylinder (10) is connected to the power machine (1), the elevating working cylinder (10) does not control the movement of the supporting frame (3) but either directly or via an armed-articulated device (as it is presented in the Fig.) it is able to arrange the movement of the timber holding frame (9) relative to the earth and the power machine.

The cutting-down of the tree and the operation of the equipment are the same as it is described in Example 1.

The invention claimed is:

1. A hydraulic equipment capable of excavating trees by disrooting them, which comprises a power machine (1), timber holding equipment (8) and a timber supporting frame (3); wherein
   one end each of a timber holding fame (9), the supporting frame (3) and an elevating working cylinder (10) are connected to the power machine (1) in a rotatable manner;
   the timber holding equipment (8), which is mounted with timber holding arms (7), is connected to the timber holding frame (9) in a rotatable manner;
   the supporting frame (3) is mounted with a supporting cylinder (4), which revolves around an axis;
   the supporting frame (3) has an articulated set-up and the movement of parts of the supporting frame is carried out by an adjusting tool (2); and
   the upper end of a throwing working cylinder (5) and a second end of the elevating working cylinder (10) are connected to one of the is parts of the supporting frame (3).

2. The equipment according to claim 1, wherein an emergency system (11) is connected to the power machine (1), which emergency system (11) is expediently a frame unit.

3. The equipment according to claim 1, wherein the supporting frame (3) comprises two parts and has one intermediate articulation.

4. The equipment according to claim 1, wherein the timber holding arms (7) are connected to the timber holding equipment (8) in a rotatable manner.

5. The equipment according to claim 1, wherein the timber holding equipment (8) is connected to the timber holding frame (9) in a rotatable manner.

6. The equipment according to claim 1, wherein the upper connecting point of the supporting frame (3) and the throwing working cylinder (5) are rotatable.

7. The equipment according to claim 1, wherein at least one of the connecting points of the elevating working cylinder (10) is fixed in a rotatable manner.

8. A hydraulic equipment capable of excavating trees by disrooting them, which comprises a power machine (1), timber holding equipment (8) and a timber supporting frame (3); wherein
   one end each of a timber holding frame (9), the supporting frame (3) and an elevating working cylinder (10) are connected to the power machine (1) in a rotatable manner;
   the timber holding equipment (8), which is mounted with timber holding arms (7), is connected to the timber holding frame (9);
   the supporting frame (3) is mounted with a supporting cylinder (4), which revolves around an axis;
   the supporting frame (3) has a rigid joint set-up and the movement of parts of the supporting frame is carried out by an adjusting tool (2), where one end of the adjusting tool (2) is connected to the supporting frame (3) and the other end of the adjusting tool is connected to a throwing working cylinder (5); and
   a second end of the elevating working cylinder (10) is connected to the timber holding frame (9).

9. The equipment according to claim 8, wherein the timber holding arms are connected to the timber holding equipment (8) in a rotatable manner.

10. The equipment according to claim 8, wherein the connecting point of the adjusting tool (2) and the throwing working cylinder (5) is rotatable.

11. The equipment according to claim 8, wherein the connecting point of the adjusting tool (2) and the throwing working cylinder (5) is rotatable.

12. The equipment according to claim 8, wherein at least one of the connecting points of elevating working cylinder (10) is fixed in a rotatable manner.

13. The equipment according to claim 8, wherein to the power machine (1) an emergency system is connected which restricts movement in space.

14. The equipment according to claim 8, wherein to the supporting frame (3) an emergency system is connected which restricts movement in space.

15. The equipment according to claim 8, wherein to the adjusting tool (2) an emergency system is connected which restricts movement in space.

16. The equipment according to claim 1, wherein an emergency system (11) is connected to the supporting frame (3), which emergency system (11) is expediently a frame unit.

17. A hydraulic equipment capable of excavating trees by disrooting them, which comprises a power machine (1), timber holding equipment (8) and a timber supporting frame (3); wherein
   one end each of a timber holding frame (9), the supporting frame (3) and an elevating working cylinder (10) are connected to the power machine (1) in a rotatable manner;
   the timber holding equipment (8), which is mounted with timber holding arms (7), is connected to a throwing working cylinder (5) in a rotatable manner;
   the supporting frame (3) is mounted with a supporting cylinder (4), which revolves around an axis;
   the supporting frame (3) has an articulated set-up and the movement of parts of the supporting frame is carried out by an adjusting tool (2); and
   the upper end of the throwing working cylinder (5) and a second end of the elevating working cylinder (10) are connected to one of the parts of the supporting frame (3).

18. The equipment according to claim 8, wherein the lower end of the throwing working cylinder (5) is connected to the timber holding equipment (8) in a rotatable manner.

19. The equipment according to claim 8, wherein the lower end of the throwing working cylinder (5) is connected to the timber holding frame (9) in a rotatable manner.

* * * * *